United States Patent [19]
Geissbuehler et al.

[11] Patent Number: 5,797,989
[45] Date of Patent: Aug. 25, 1998

[54] APPARATUS FOR THE CONTINUOUS CRYSTALLIZATION OF POLYESTER MATERIALS

[75] Inventors: Hans Geissbuehler, Zuzwil; Heinz Gasser, Wil, both of Switzerland

[73] Assignee: Buehler AG, Uzwil, Switzerland

[21] Appl. No.: 585,116

[22] Filed: Jan. 11, 1996

[30] Foreign Application Priority Data

Jan. 9, 1995 [DE] Germany .................. 195 00 383.7

[51] Int. Cl.⁶ .................................................. C30B 35/00
[52] U.S. Cl. .................. 117/200; 23/295 R; 117/200; 422/245.1
[58] Field of Search .................. 23/295 R; 117/200, 117/206; 422/245.1, 252

[56] References Cited

U.S. PATENT DOCUMENTS

| | | | |
|---|---|---|---|
| 3,328,894 | 7/1967 | Smith | 34/583 |
| 3,565,408 | 2/1971 | Reh et al. | 263/52 |
| 3,892,539 | 7/1975 | Midler, Jr. | 23/307 R |
| 4,064,112 | 12/1977 | Rothe et al. | 528/272 |
| 4,584,366 | 4/1986 | Gerking et al. | 528/308.2 |
| 4,781,899 | 11/1988 | Rauh et al. | 423/206 T |
| 5,119,570 | 6/1992 | Russemeyer et al. | 34/363 |
| 5,280,813 | 1/1994 | Jackson | 141/4 |
| 5,391,355 | 2/1995 | Dibble et al. | 422/131 |

FOREIGN PATENT DOCUMENTS

| | | |
|---|---|---|
| 0379684 | 8/1990 | European Pat. Off. |
| 2559290 | 7/1977 | Germany |
| 3213025 | 10/1983 | Germany |
| WO8911073 | 11/1989 | WIPO |

*Primary Examiner*—Felisa Garrett
*Attorney, Agent, or Firm*—McAulay Fisher Nissen Goldberg & Kiel, LLP

[57] ABSTRACT

An apparatus for the continuous crystallization of polyester material is described, which apparatus can likewise be used for the drying of granules. The apparatus operates to improve the residence behavior of the material and the process. This is achieved by a circular apparatus having a gas inlet and gas outlet and product entry and product outlet. The product entry and product outlet are arranged concentrically and parallel to the axis of the apparatus. A product outlet device is arranged so that it is axially displaceable.

6 Claims, 2 Drawing Sheets

APPARATUS FOR THE CONTINUOUS CRYSTALLIZATION OF POLYESTER MATERIALS

BACKGROUND OF THE INVENTION a) Field of the Invention

The invention relates to an apparatus for the continuous crystallization of polyester material, in particular, granules of linear, thermoplastic polyesters, primarily polyethylene terephthalate (PET).

b) Description of the Related Art

Owing to good physical properties, PET has become widely used, in particular, as textile fibers, as a film or for bottles in the beverages industry.

However, a required, high molecular weight and high purity are achievable only by solid-phase after treatment. Amorphous granules are prepared as an intermediate, but these absorb moisture. During drying, as in the case of crystallization and solid-phase postcondensation, the granules tend to stick together. Agglomeration and caking can be prevented by crystallization methods. Continuous crystallization in a stirred bed is widely used. The corresponding containers have stirring elements which move the granules essentially transversely to the direction of flow. In addition to horizontal apparatuses, in particular vertical apparatuses are known (for example according to German Auslegeschrift 2,559,290 or German Offenlegungsschrift 3,213,025). Owing to the forced movement of the stirrer, the granules are subjected to a mechanical load in an uncontrolled manner and material may cake on the stirring element itself.

On the other hand, a fluidized bed operates without mechanical baffles. A fluidized-bed apparatus has a larger specific volume and circulation of the process gas. EP-B-379684 is intended to counteract the disadvantage of a broad residence time spectrum. This teaches the passing of the polyester material through two fluidized beds connected in series, the first of which is a solids-air jet with mixing characteristics and the second of which is a fluidized bed with plug flow characteristics.

Here, the solids-air jet has a shaft-like, vertical container with a perforated base for entry of the gas. The granules enter the container through a drop tube and leave it through a lateral discharge slot. Particularly with a possible box-like design of the container, comparatively poor gas tightness associated with high production costs and, in some cases, a problematic procedure is disadvantageous.

It is also known that mechanical stirring or mixing and a fluidized bed can be combined with one another, at least the high complexity of the apparatus remaining as a disadvantage.

OBJECT AND SUMMARY OF THE INVENTION

It is therefore the primary object of the invention to develop a fluidized-bed apparatus of the generic type so that the disadvantages of the prior art are avoided and that improved residence time behavior of the material, higher operating temperatures and simpler production are achieved.

This object is achieved in accordance with the invention by apparatus for the continuous crystallization of polyester material and the like having a housing-like jacket in which a treatment space is formed, a gas entry connection and a gas outlet connection, a perforated base and a product entry and a product outlet. The improvement comprises that the product entry and a product outlet means are arranged concentrically and parallel with an axis of the housing-like jacket. The product outlet means is axially displaceable.

The fluidized-bed apparatus, therefore, according to the invention consists essentially of a cylindrical housing (jacket) having a perforated base, a gas entry underneath and a gas outlet on top, and a product entry preferably arranged concentrically in the jacket and having an adjustable product outlet, the product entry and product outlet being arranged parallel to the axis.

The round and symmetrical housing shape also avoids corners, so that conditions are similar for the entire product. Furthermore, there is a pressure increase to enhance the thermal power. Although EP-A-379684 also describes a drop tube projecting into the apparatus and intended for product feed, such a simple, laterally inclined drop tube is as little comparable with the arrangement according to the invention as is a hydraulically adjustable central element according to U.S. Pat. No. 3,328,894.

The shaft-like fluidized-bed chamber disclosed in WO 89/11073 also has only lateral inlets and outlets for the product, but only a central feed hopper is provided for a lower chamber.

The apparatus according to the invention makes it possible to improve the residence behavior of the material and generally to optimize the procedure in terms of energy and throughput. The gas-tight design is simpler to produce than existing means and furthermore permits operating temperatures up to about 250° C.

In order to improve the product distribution, static or dynamic distributors known per se may be arranged, for example according to U.S. Pat. No. 5,280,813.

The arrangement of the necessary adjustment means outside the treatment space likewise improves the procedure and the gas tightness.

The invention is described in more detail below in an embodiment with reference to a drawing.

DESCRIPTION OF THE PREFERRED EMBODIMENTS

Figure 1:
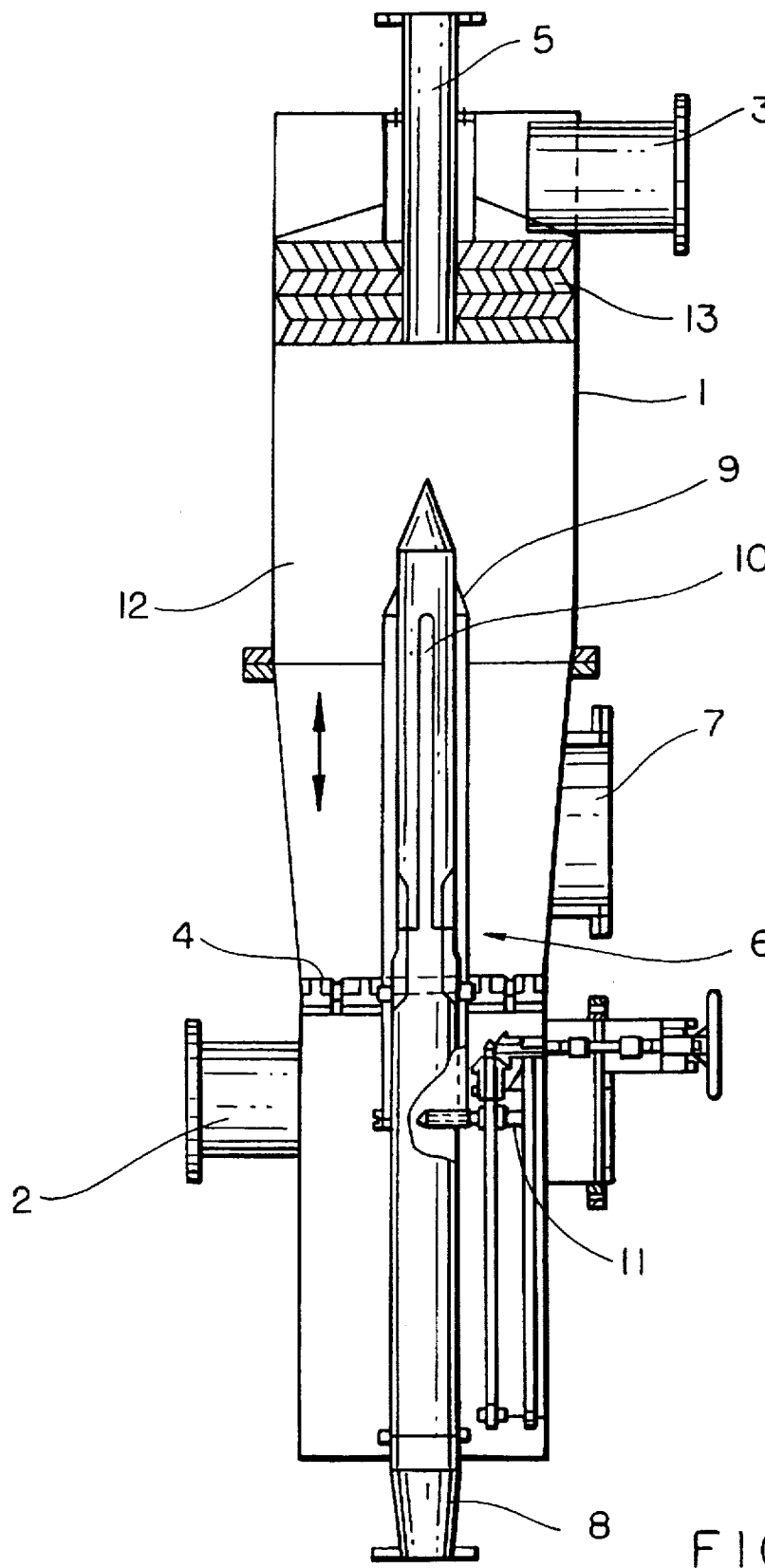
FIG. 1 shows an apparatus in sectional diagram.
Figure 2:
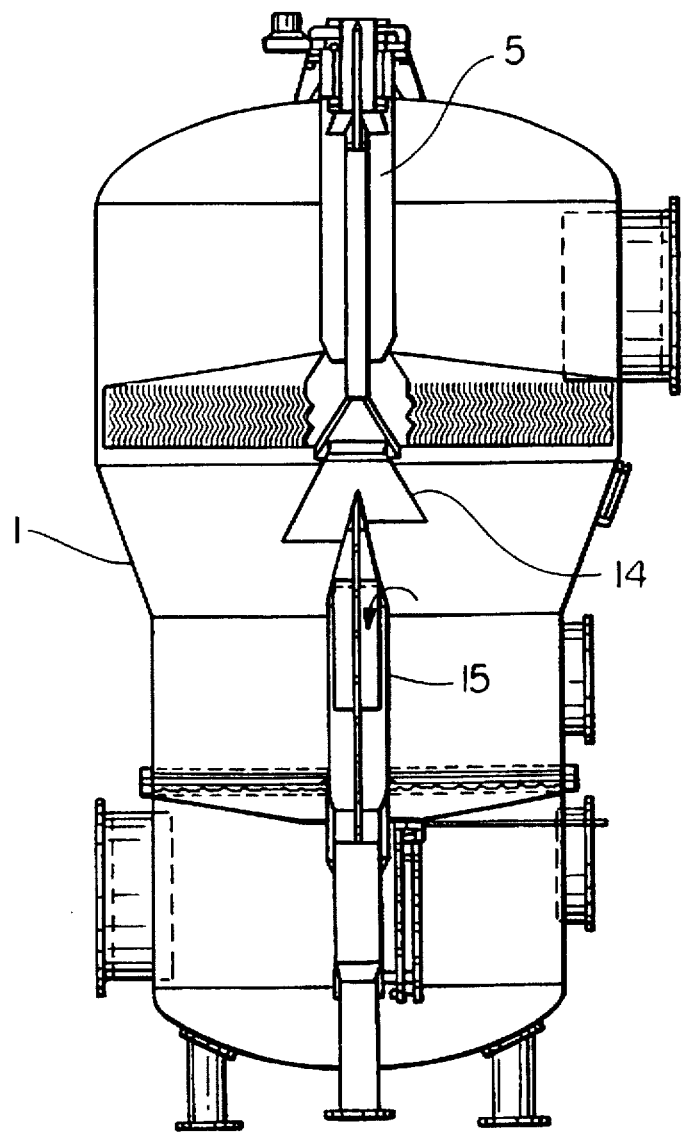
FIG. 2 shows the product entry region in a further sectional diagram.

The apparatus has a jacket 1 which consists of annular components and possesses a lateral gas entry connection 2 in the lower region and an upper gas outlet connection 3 and a perforated base (base discharge) 4 and an inspection orifice 7. A tubular product entry 5 and a product outlet means 6 are arranged concentrically in the jacket 1, parallel to the axis. The product outlet means consists of a tubular lower part 8 which is extended upwards and stepped and serves as a guide for an upper part 9. The upper part 9 is vertically displaceable and is provided with windows 10 and is connected to an adjustment means arranged below the perforated base 4.

Owing to the conical shape of the tip of the upper part 9, uniform product distribution in the treatment space 12 is achieved. In the case of large treatment spaces 12, a conventional product distributor 14 may additionally be provided between the product entry 5 and upper part 9.

The lower part of the treatment space 12 is preferably conical in the case of small height:diameter ratios.

If the windows 10 are covered by the tubular upper part 9, the upper part 9 can be moved upwards to such an extent that windows are also exposed at the height of the perforated base 4, in order to empty the treatment space 12.

The result is a pressure-resistant and tight embodiment of the jacket 1, it being possible for the adjustment means 11 and the product outlet means 6 to be assembled separately and installed as complete units in the jacket 1.

For dust separation, a zig-zag separator 13, which is likewise known, is arranged upstream of the gas outlet connection 3.

By adjusting the upper part 9, the extent of opening of the windows 10 and hence the product discharge, for example of a crystalline polyester material, can be varied.

Furthermore, a distributor 14 which is known per se can be arranged for better distribution of the product to be introduced, it being possible, if required, for the product entry 5 also to be arranged laterally and inclined (not shown). The distributor may also be provided with spiral blades or distributing elements and is rotatably arranged.

The upper part 9 is vertically adjustable and, together with or in conjunction with the displaceable pipe 15, performs an overflow function.

The achievement according to the invention is not limited to these embodiments and can in principle also used for the treatment and drying of granules and the like.

While the foregoing description and drawings represent the preferred embodiments of the present invention, it will be obvious to those skilled in the art that various changes and modifications may be made therein without departing from the true spirit and scope of the present invention.

LIST OF REFERENCE SYMBOLS

1 Jacket
2 Gas entry connection
3 Gas outlet connection
4 Perforated base
5 Product entry
6 Product outlet means
7 Inspection orifice
8 Lower part
9 Upper part
10 Window
11 Adjustment means
12 Treatment space
13 Zig-zag separator
14 Distributor
15 Pipe

What is claimed is:

1. In an apparatus for the continuous crystallization of polyester material having of a housing jacket in which a treatment space is formed, a gas entry connection and a gas outlet connection, a perforated base and a product entry and a product outlet, the improvement comprising that the housing jacket has an axis and that the product entry and product outlet means are arranged concentrically and parallel with said axis in the housing jacket, said product outlet means being axially displaceable.

2. The apparatus according to claim 1, wherein the jacket is cylindrical.

3. The apparatus according to claim 1, wherein said product outlet means consists of a tubular lower part and an upper part provided with orifices, said lower part simultaneously being formed as a guide for the displaceable upper part and wherein an adjustment means engages the upper part.

4. The apparatus according to claim 3, wherein said adjustment means is arranged outside the treatment space.

5. The apparatus according to claim 1, wherein said adjustment means is arranged outside the treatment space.

6. The apparatus according to claim 1, including means for arranging said apparatus vertically or horizontally.

* * * * *